(No Model.)
G. M. HINKLEY.
COMBINED BAND AND CIRCULAR SAW MILL.
No. 348,282. Patented Aug. 31, 1886.
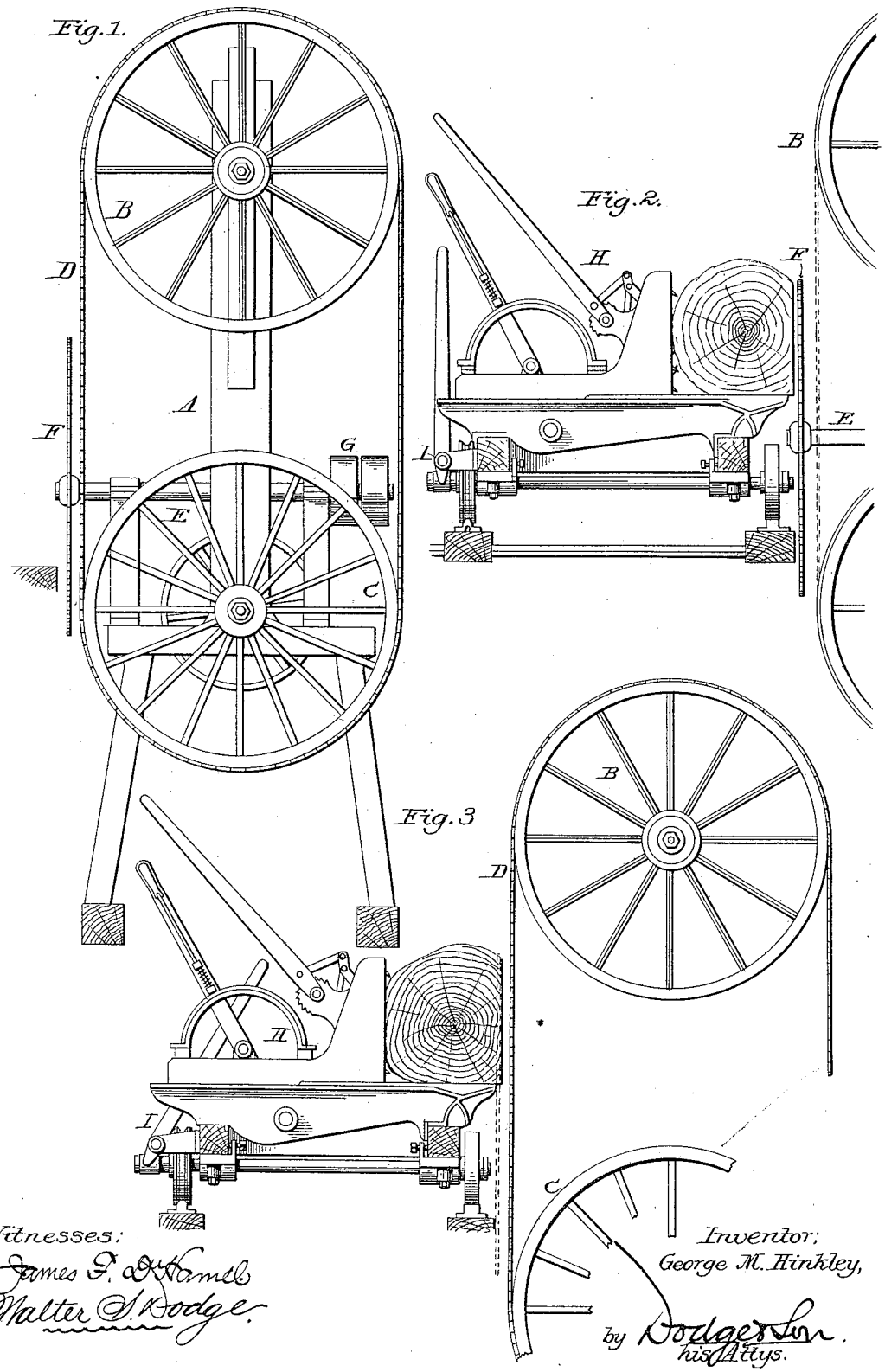
Witnesses:
James F. Du Hamel
Walter S. Dodge
Inventor:
George M. Hinkley,
by Dodger Son
his Attys.

United States Patent Office.

GEORGE M. HINKLEY, OF MILWAUKEE, WISCONSIN, ASSIGNOR OF ONE-HALF TO EDWARD P. ALLIS, OF SAME PLACE.

COMBINED BAND AND CIRCULAR SAW MILL.

SPECIFICATION forming part of Letters Patent No. 348,282, dated August 31, 1886.

Application filed April 29, 1886. Serial No. 200,508. (No model.)

*To all whom it may concern:*

Be it known that I, GEORGE M. HINKLEY, of Milwaukee, in the county of Milwaukee and State of Wisconsin, have invented certain new and useful Improvements in Combined Band and Circular Saw Mills, of which the following is a specification.

My invention relates to that class of saw-mills in which a circular saw is combined and mounted in the same frame-work with a band-saw; and the invention consists in a novel arrangement of the saws with respect to a traveling offsetting-carriage which moves past the saw, whereby either or both of the saws may be used at will.

I desire to state here that I am aware that it is not new to combine a band-saw and a circular saw in one machine, the saws occupying a common vertical plane lying between the frame-work and the traveling carriage. In the present instance the two saws do not occupy the same vertical plane, but one (preferably the circular saw) extends or projects toward the carriage a slight distance farther than the band-saw, for the purposes presently explained.

In the drawings, Figure 1 is a side view of a saw-mill constructed in accordance with my invention, and Figs. 2 and 3 are views illustrating the two saws in use separately.

A indicates a substantial framing, which may be of any ordinary construction, and B C are the band-saw-supporting wheels, around which the band-saw D passes.

E indicates a shaft or arbor journaled in bearings on the frame-work, and carrying at one end the circular saw F, and at the other end a band-wheel, G, through which latter motion is imparted to the saw. Upon reference to Figs. 1, 2, and 3, it will be seen that the circular saw F occupies a plane between the frame-work A and the carriage H about an inch and a half, more or less, in advance of the plane occupied by the band-saw D. The carriage H is what is termed an "offsetting-carriage"—that is to say, a carriage that is movable to and from the saw at right angles to its line of travel—and said carriage is provided with an offsetting device, I, which, for the purpose of illustration, is the same as that secured to me by Letters Patent No. 330,484, dated November 17, 1885. The present invention, however, is not restricted to the use of any particular form of offsetting mechanism.

When it is desired to use the circular saw F, the band-saw need not be dismounted, but may be, if desired, and the carriage H is offset away from the saw by the mechanism I, as shown in Fig. 2. Now, when it is desired to use the band-saw alone, the circular saw is dismounted and the carriage is set forward by the mechanism I toward the saw, as shown in Fig. 3. In some cases it is desirable to use both saws at the same time, in which case the carriage would occupy the position shown in Fig. 3, the circular saw not being dismounted.

Having thus described my invention, what I claim is—

1. In a saw-mill, the combination, with a fixed frame-work, of a saw-mill carriage movable past the frame-work, a band-saw, and a circular saw, both mounted upon the frame-work, and occupying different vertical planes between the frame-work and the movable carriage, and an offsetting mechanism applied to the carriage, all combined and arranged to operate substantially as described, whereby either or both of the saws may be used at will.

2. In combination with frame A, carriage H, movable past the frame-work, wheels B C, journaled in the frame-work, saw D, passing about said wheels and between the carriage and the frame-work, saw-arbor E, journaled in the frame-work, circular saw F, secured thereto and occupying a vertical plane a slight distance in advance of the band-saw, devices for causing the proper movement of the saws, and an offsetting device, I, applied to the carriage, all substantially as described and shown.

3. In a saw-mill, the combination, with a fixed frame-work, band-wheels B C, mounted therein and adapted to carry a band-saw, arbor G, mounted on the frame-work and adapted to carry a circular saw in a vertical plane out of line but parallel with the plane of the cutting side of the band-saw, a log-carriage movable past the frame-work, and an offsetting mechanism applied to the carriage and adapted to shift the same a distance equal to that between the two planes in which the respective saws move.

Witnesses:    GEORGE M. HINKLEY.
  WM. W. ALLIS,
  EDW. F. BYRON.